(12) United States Patent
Pegg

(10) Patent No.: US 7,061,667 B2
(45) Date of Patent: Jun. 13, 2006

(54) OPTICAL AMPLIFIERS

(75) Inventor: Steven Ian Pegg, Northampton (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 10/510,795

(22) PCT Filed: Apr. 7, 2003

(86) PCT No.: PCT/GB03/01530

§ 371 (c)(1),
(2), (4) Date: May 4, 2005

(87) PCT Pub. No.: WO03/088433

PCT Pub. Date: Oct. 23, 2003

(65) Prior Publication Data

US 2005/0225845 A1    Oct. 13, 2005

(30) Foreign Application Priority Data

Apr. 8, 2002 (GB) ................................. 0208082.8

(51) Int. Cl.
*H01S 3/00* (2006.01)
*G02B 6/36* (2006.01)
(52) U.S. Cl. ...................... 359/341.1; 385/88
(58) Field of Classification Search ................ 359/333, 359/341.1; 385/53, 88
See application file for complete search history.

(56) References Cited

U.S. PATENT DOCUMENTS 6,222,670 B1 * 4/2001 Ryu et al. .................... 359/345
6,917,731 B1 * 7/2005 Bennett et al. ................ 385/15

FOREIGN PATENT DOCUMENTS

| DE | 100 58 059 A1 | 6/2001 |
| EP | 0 800 286 A2 | 10/1997 |
| EP | 1 087 550 A1 | 3/2001 |
| GB | 2 340 989 A | 3/2000 |
| GB | 2 344 210 A | 5/2000 |
| WO | WO 00/24094 | 4/2000 |

* cited by examiner

*Primary Examiner*—Mark Hellner
(74) *Attorney, Agent, or Firm*—Kirschstein, et al.

(57) ABSTRACT

An L-band EDFA may have three amplifier stages. In the first stage, a high power 980 nm laser is used to generate C-band ASE noise which is used to pump the erbium doped fiber of the second stage. The second stage fiber is arranged as a plug-in module which connects between a first stage isolator and a mid-stage loss between the second and third stages. The desired gain of the amplifier is obtained by selecting a plug-in module with a length of fiber that will give the desired amplifier output power for a given input power.

11 Claims, 5 Drawing Sheets

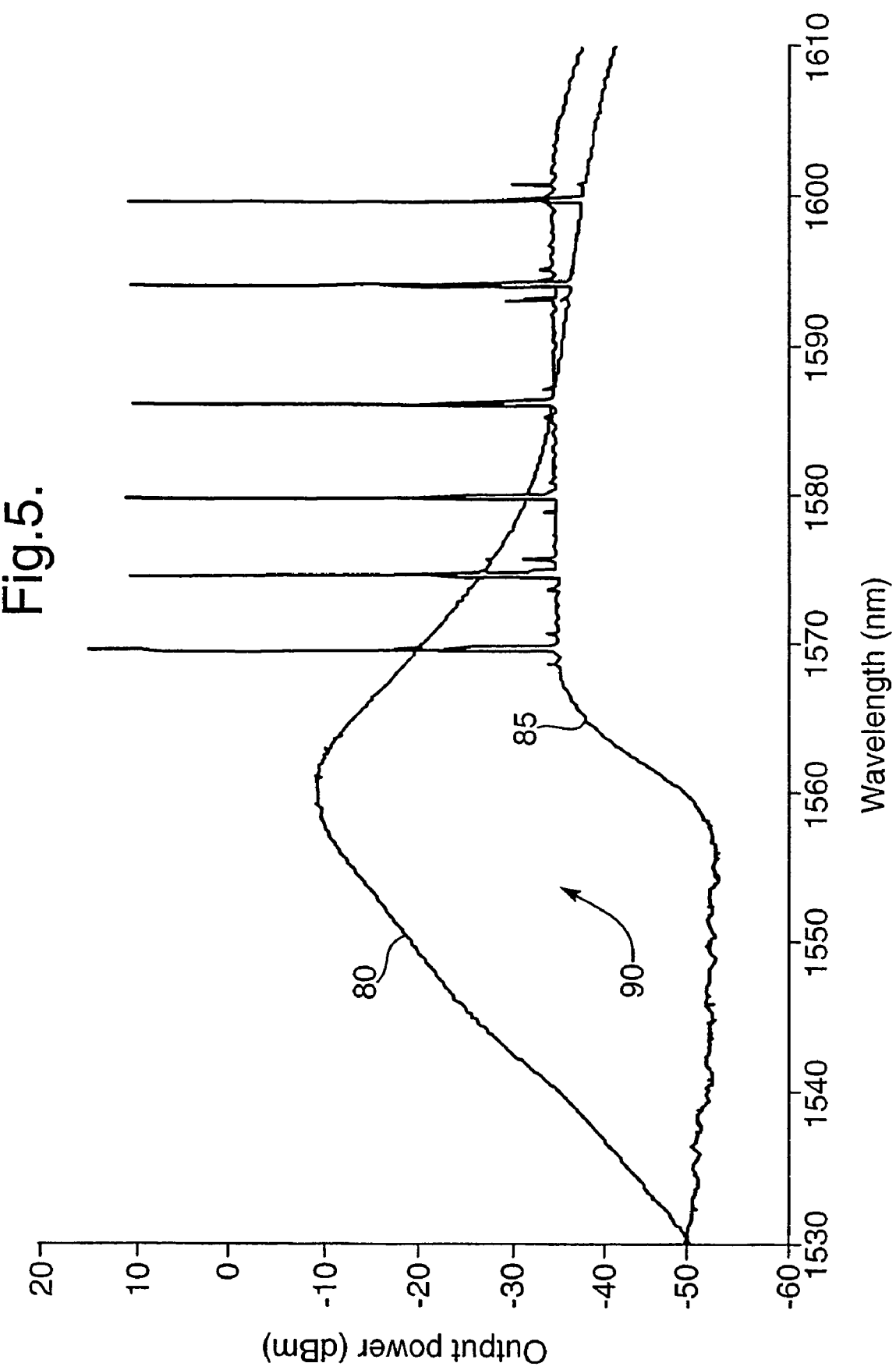

OPTICAL AMPLIFIERS

THE BACKGROUND OF THE INVENTION

This invention relates to optical amplifiers and in particular to EDFAs (Erbiun Doped Fibre Amplifiers). It is especially, but not exclusively, concerned with L band amplifiers.

EDFAs are well known in optical transmission systems such as WDM (Wave Division Multiplex) and DWDM (Dense Wave Division Multiplex) and are used to compensate for optical losses which occur over the transmission length. Optical losses between amplification points vary according to the span distance or fibre properties as well as other factors. As a result, the input power to different amplifiers along a transmission line is not constant. As a result, amplifiers with varying optical gains have to be designed to insure constant launch power characteristics. Any fixed gain amplifier has a highly dependent gain flatness which depends on input power. Existing systems are designed using a discrete set of amplifiers each operating over a limited input power range. This is undesirable and expensive, leading to difficulties in stock control, particularly the need to manufacture and store a variety of different amplifiers.

Document U.S. Pat. No. 6,222,670 shows a multistage optical amplifier in which the length of a fibre of a second EDFA was charged as part of the procedure of analysing the performance of the amplifier.

An alternative approach is to design variable gain amplifiers which have a variable optical attenuator (VOA)to engineer the inversion required along the length of the amplifier. Such amplifiers allow around 8–10 dB of dynamic input power range without significantly impairing the optical signal to noise ratio (OSNR). However, they require the amplifier to be designed for the highest gain they will ever need. This maKes them expensive. VOA control is complex and adds in the order of 20% of the cost compared to already expensive fixed gain amplifiers.

Thus, there is a problem in providing relatively inexpensive amplification in environments where a number of different amplifiers are required having different input powers. The present invention addresses that problem.

SUMMARY OF THE INVENTION

The invention provides an amplifier which has a plug-in stage which comprises a length of erbium doped fibre whose length depends on the input signal power and the desired output signal power. To enable a plug-in stage to be used, a first amplifier stage is arranged deliberately to generate ASE (Amplified Spontaneous Emission) noise in a wavelength band shorter than the wavelength band of the signals to be amplified. This ASE power is used to pump the plug-in second stage fibre in place of a standard pump laser.

More specifically, there is provided an erbium doped fibre amplifier (EDFA), comprising first and second amplifier stages, the first amplifier stage comprising a high power pump laser and erbium doped fibre for generating amplified spontaneous emission (ASE) at a first wavelength band, and the second amplifier stage comprising erbium doped fibre arranged to be pumped by the ASE from the first amplifier stage to generate gain in signal channels at a longer wavelength than the first wavelength band, wherein the second amplifier stage comprises a removable length of erbium doped fibre selectable to produce a required output power for a given input power.

The invention also provides an erbium doped fibre amplifier (EDFA) comprising first, second and third amplifier stages, the first and third stages comprising fixed gain stages having a pump laser and a length of erbium doped fibre, the pump laser of the first stage being a high power pump laser for generating amplified spontaneous emission (ASE) noise in a shorter wavelength band than the wavelength band of the signals to be amplified by the EDFA, and wherein the second amplifier stage comprises one of a plurality of plug-in stages each comprising a different length of erbium doped fibre which in use is pumped by the ASE noise generated by the first amplifier stage, the plug-in stage being chosen to produce a predetermined output signal power from the third amplifier stage for a given signal input power to the first amplifier stage.

In a preferred embodiment of the invention, the amplifier is an L-band amplifier and the ASE noise generated by the first amplifier stage is C-band ASE noise. For such an L-band amplifier, it is preferred that the first amplifier stage pump laser achieves near total inversion of erbium ions in the first stage erbium doped fibre to generate the C-band ASE noise. It is therefore preferred that the first stage pump laser is a 980 nm laser. The laser may have a power as high as several hundred MWs.

Preferably the EDFA has a third stage including mid-stage loss arranged between the plug-in second stage and the third stage. This stage may form part of the plug-in stage. The third stage may be a conventional erbium doped fibre and pump laser such as a 1480 nm pump laser.

Embodiments of the invention have the advantage that a single amplifier with a selection of plug-in modules can be used to provide all the in-line amplifiers in a transmission line regardless of the different gain requirements. This has the advantage that manufacturers only need to make a single design and keep a simple component which reduces costs. The plug-in module is simple, comprising essentially a length of erbium doped fibre and the cost of keeping several plug-in units with different lengths of fibre is small compared to the overall cost of the amplifiers.

As the second stage of the amplifier does not use a pump laser and associated control circuits, the cost of an amplifier embodying the invention is significantly reduced over the prior art, particularly as the pump laser assembly is one of the most expensive parts of the assembly. An L-band amplifier of the assembly embodying the invention may be in the order of 30% cheaper than conventional L-band amplifiers.

A preferred embodiment of the invention using a 980 nm pump laser in the first stage to generate C-band ASE noise has the advantage that near total inversion of erbium ions can be achieved which results in a consistently low noise amplifier.

BRIEF DESCRIPTION OF THE DRAWINGS

Embodiments of the invention will now be described, by way of example only, and with reference to the accompanying drawings, in which:

FIG. 5 is a graph of output power against wavelength for the outputs from the first and second stages of the amplifier of FIG. 4.

DETAILED DESCRIPTION OF THE PREFERRED EMBODIMENTS

Figure 1:
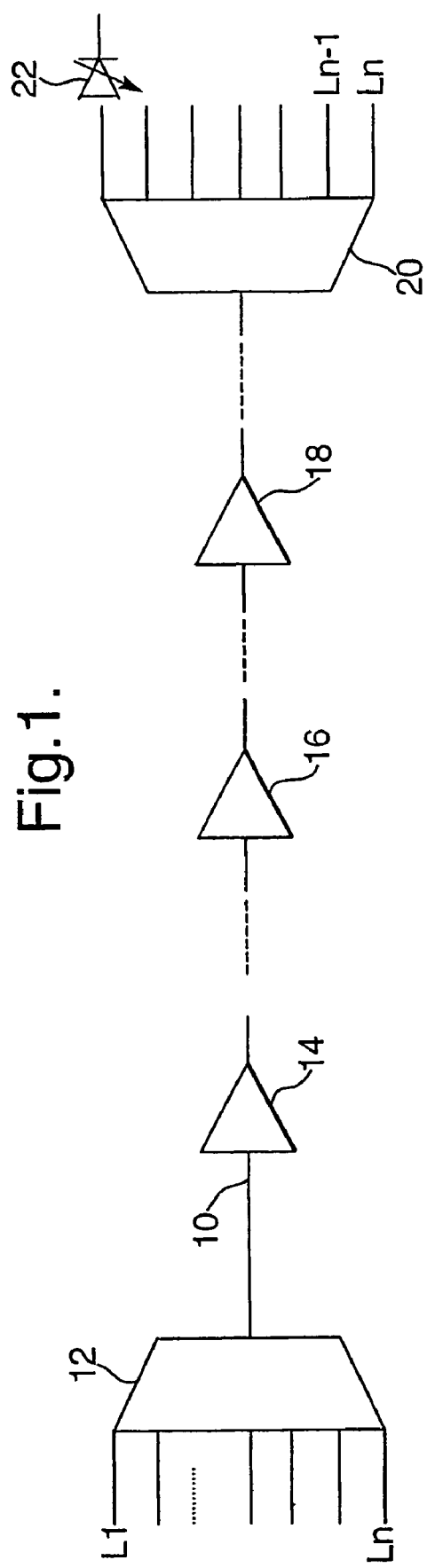
FIG. 1 is a schematic view of a typical DWDM optical transmission line having a number of stages of amplification.
Figure 2:
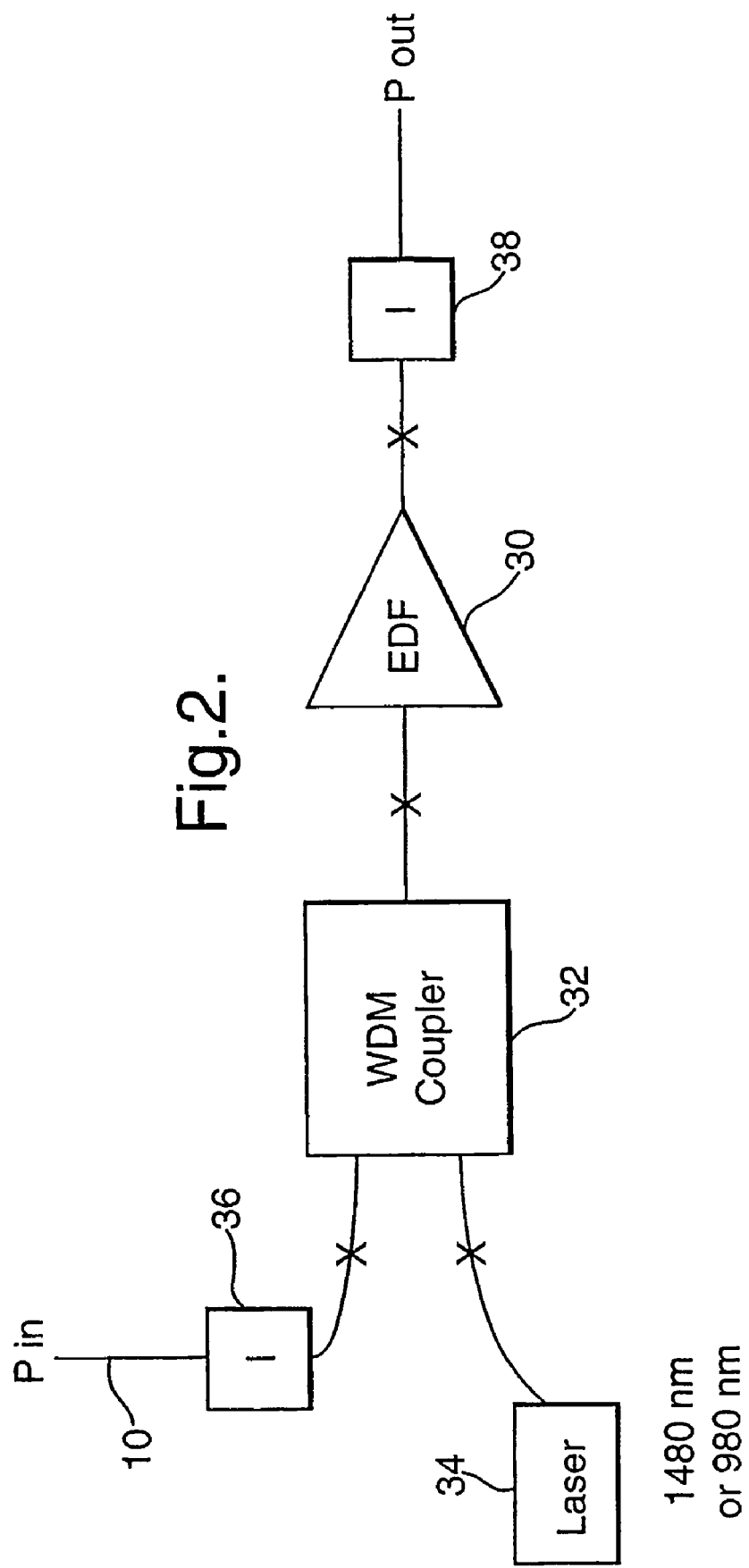
FIG. 2 is a schematic view of a EDFA amplifier.

Referring to FIG. 1, a number of wavelength channels □$_1$ to □$_n$ are multiplexed on a single fibre 10 by an optical multiplexer 12. The resultant multiplexed signal is amplified at a number of points along the transmission line. In this example, three amplification sites 14, 16, and 18 are shown. After the final amplification the signal multiplex is separated into its constituent channels □$_1$ to □$_n$ by a demultiplexer 20. The individual channels are then converted into optical signals by photodiodes 22.

Each of the amplifiers is an EDFA and the input power required for each will depend on a number of factors, including the signal attenuation at the amplifier input. A typical signal loss is in the order of 0.2 dB/km. The span distances between amplifier stages are variable, depending on the physical layout of the network. In the example of FIG. 1, typical span distances may be 100 km between the first and second EDFA amplifiers 14,16 having a loss of around 25 dB, and 20 km between the second and third amplifiers 16,18 having a loss in the order of 10 dB.

International Telecommunications Union standards dictate a channel spacing of 100 GHz within typical WDM systems, meaning a system carrying 40 channels requires a 4000 GHz bandwidth.

As is well known, 1550 nm falls within the C-band and is in the middle of a region where the EDFA response is relatively flat with varying wavelength whilst still giving a high gain coefficient.

The L (long) band refers to wavelengths between about 1570 nm and 1605 nm. Gain in these regions is achieved by reducing the pump power input into the erbium doped fibre compared to the C-band. A reasonably flat gain curve is achieved across the band but the relative gain coefficient is considerably less than that achieved in the C-band. This comparatively smaller gain may be compensated for by using longer lengths of erbium doped fibre in the amplifiers and higher doping concentrations.

In the design of amplifiers, it is the loss between each span that determines the input power to the amplifier. The designer is concerned with the signal loss at the next amplification stage. It is conventional to launch a constant output power into each span as this simplifies system design. When designing systems, a large degree of margin is introduced for a number of reasons, for example, to take into account the loss of gain that will occur as the fibre ages, and also to allow for significant loss variation that will occur if the fibre is spliced, for example, following an accidental severance.

This requirement for margin must be balanced by the need to control cross talk between channels as well as other non-linear effects. These effects increase with signal launch power. As DWDM systems evolve, channel spacings are tending to move from 100 GH$_z$ to 50 GH$_z$ and even 25 GH$_z$. Thus it is desirable to use the minimum necessary power, but to ensure that there is the same output power from each amplifier stage. As a result, the amplifiers are required to work over a wide range of gains. Ideally, the gain of each amplifier would be tailored to the loss of the previous section. This has given rise to the existing practice of using several different in-line amplifiers as the range of span losses, which may vary by up to 20 dB, is too great to be handled by varying the gain of a single amplifier. Typically, a number of different amplifiers will be specified, each handling a range of input power. The appropriate amplifier is chosen according to the span loss but the manufacturer has to carry a large inventory of different amplifiers.

The present invention is based on the use of the C-band to pump the L-band. It is not limited to the C and L band but broadly uses a shorter wavelength emission to pump a longer wavelength. For example, the L-band could be used to pump the XL band. The theory of using the C-band to pump the L-band is known and discussed in papers entitled "Gain Enhancement in Gain-Shifted Erbium —Doped Fibre Amplifiers for WDM Amplifiers" by M. Karasek, IEEE Photonics Technology Letters Vol II No. 9 pp 1111–1113; and "Enhancement of Power Conversion Efficiency for an L-Band EDFA with a Secondary Pumping Effect in the Unpumped EDF Section" by Lee et al. IEEE Photonics Technology Letters Vol II No. 1 pp 42–44.

The amplifier consists of a length of erbium doped fibre 30 which receives the output from a WDM coupler 32. The inputs to the WDM coupler comprise a pump laser 34 operating at 980 nm or 1480 nm and the signal power on the main transmission fibre 10. The transmission fibre is isolated by an isolator 36 before the WDM coupler and a further isolator 38 is arranged at the output of the amplifier.

The laser radiation excites $Er^{3+}$ ions in the fibre and can generate three kinds of transitions: absorption; stimulated emission; and spontaneous emission. Stimulated emission occurs when incoming photons from the pump laser causes excited ions to return to the ground state. The photons emitted are coherent and cause amplification of the incoming signal. For efficient operation, it is desirable to maximise these emissions. Conventionally, it is desirable to minimise spontaneous emissions which occur when excited ions relax to the ground state with an uncontrolled emission of photons. This gives rise to noise. The purpose of the pump laser is to excite the erbium ions. The energy delivered decreases with increasing laser wavelength. Thus, a 980 nm laser delivers more energy than a 1480 nm laser. The 1480 nm pump will excite erbium $3^+$ ions to the top of the 4I 13/2 band. Whereas pumping with a 980 nm laser excites the $Er^{3+}$ ions to the 4I 15/2 band. The laser pump wavelength must be lower than that of the wavelength emitted by the erbium ions as they relax. 980 nm laser pumps give better noise performance but 1480 nm pumps are more efficient (giving higher output signal power).

Figure 3:
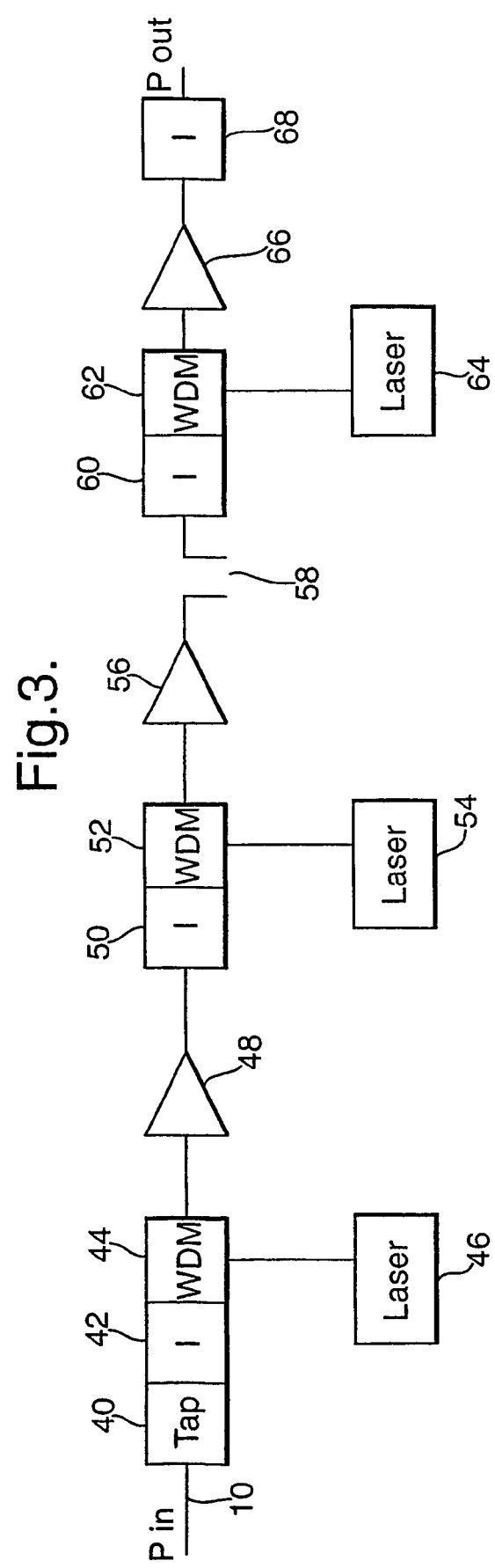
FIG. 3 is a more detailed view of the amplifier of FIG. 2.

FIG. 3 shows, schematically, the construction of a typical L-band EDFA, such as may be used as an in-line WDM amplifier. The amplifier has three amplification stages as the gain is required to be increased gently so as to balance spectral flatness and noise performance.

The input signal, shown as $P_{in}$ on the transmission fibre 10 arrives at a block comprising a tap 40, an isolator 42 and a WDM coupler 44. A pump laser 46 provides the other input to the WDM coupler 44 to forward pump the first stage of erbium doped fibre (EDF) 48. The output side of the EDF is isolated by isolator 50 and then passed to a further WDM coupler 52 which couples energy from a further pump laser 54 to the fibre. Following a second stage of EDF 56, a mid-stage access (with a fixed loss) 58 may be included. This stage could house a dispersion compensating unit for the multiplexed signals as described above. The mid-stage access point is followed by a further isolator 60 and a further pump laser 64 coupled to the system by a further WDM coupler 62 and which pumps a third section of EDF 66. The final amplified signal passes through a further isolator 68 which forms the final stage of the amplifier. The output power at this point should be the same for all EDFAs on the transmission line.

For L-band amplifiers, the total EDF length may be as high as 100 m. This is several times the length of fibre required in a C-band amplifier. In addition, the fibre is doped with a higher concentration of erbium ions than is used for C-band amplification.

Returning now to the dispersion compensation stage 58, it is common practice to embed the dispersion compensation before the final amplification stage. The core of the dispersion compensation fibre is narrower than that of standard transmission fibre such as SMF, DMF or NZ-DSF fibre. This means that the power density in the core of the DCF is greater than in the rest of the link. It is therefore good practice to pass the signal through the DCF before the signal power is boosted by the final amplification stage.

As the power input to the EDFA described above varies, the amplifier gain will tilt. As the amplifier becomes more inverted it tilts towards the C-band. This is clearly undesirable in an L-band amplifier. This has given rise to the use of several different in-line amplifiers in the prior art. Each of these can be operated within a power input range that gives a nominally flat gain across all the channels. In practice a flatness of about 1 dB is acceptable. In order to change the gain, more erbium must be used in the fibre. This may be achieved, for example, by having a variable length second amplifier stage with variable laser pumping power. However, problems arise with the restrictions caused by the high power density in the dispersion compensation fibre mentioned above.

Figure 4:
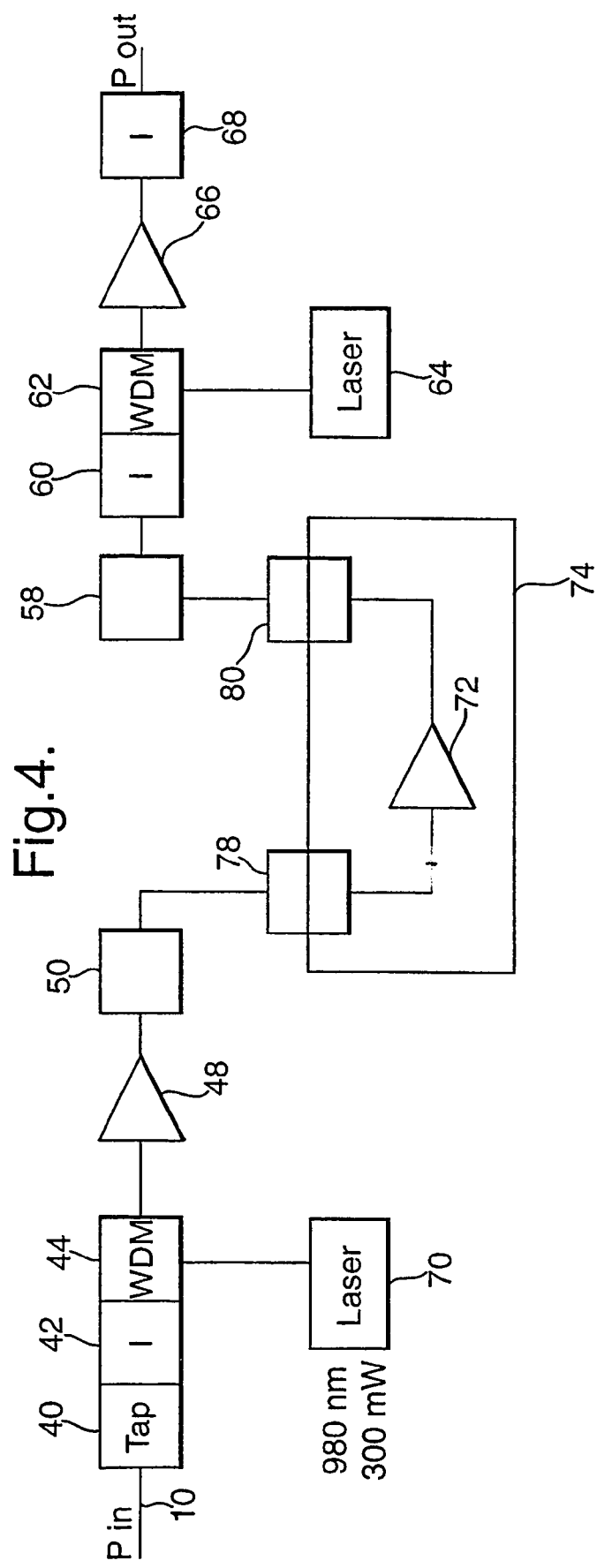
FIG. 4 a schematic view of an EDFA embodying the invention.

FIG. 4 shows an amplifier embodying the invention. As is known from the papers entitled "Gain Enhancement in Gain-Shifted Erbium-Doped Fibre Amplifiers for WDM Applications" by Karasek; and "Enhancement of Poser Conversion Efficiency for an L-band EDFA with a secondary Pumping Effect in the Unpumped EDF Section" by Lee et al. referred to above, C-band ASE power can be used to pump the EDF and provide gain to the L-band channels within the amplifier. A highly inverted first stage generates a large amount of forward propagating C-band ASE.

We have appreciated that high power 980 nm pump lasers may be used for the first stage. This laser may have a power in the order of 300 mW. As can be seen from FIG. 4, the second amplifier stage is not pumped by a laser, relying exclusively on the C-band ASE for the pumping power. We have further appreciated that by using C-band ASE for the pumping power, a single amplifier can be produced with a modular second section that is selected according to the flat gain value required. This modular section may be a drop-in section. This overcomes the problem with the prior art discussed above, where a family of amplifiers had to be made and stored. In the embodiment of FIG. 4, a single amplifier is produced with a family of drop-in second stages. Unlike the first and third stages the drop-in stages have no expensive external components such as lasers or couplers but consist, essentially, of lengths of EDF.

Thus, in FIG. 4, the first and third stages of the amplifier are similar to those of FIG. 3. However, the pump laser 70 of the first stage is a high power 980 nm laser. Although 300 mW has been given as an example of the power rating, the power will vary depending on the application. It is important that the laser power is sufficient to obtain total or near total inversion of the $Er^{3+}$ ions. This has the added benefit of providing good noise properties.

In FIG. 4, the output of the first EDF stage 48 passes through an isolator 50. The second, unpumped section of EDF 72 is inserted as a drop-in section indicated by line 74. The ends of the drop-in section of fibre are coupled to the remainder of the amplifier by connectors 78,80. One half of each connector pair is provided on the drop-in module and the other on the amplifier.

It is preferred that the drop-in section is in advance of the dispersion compensation fibre 58 although the DCF 58 could be arranged on the drop-in section. The second stage fibre soaks up the C-band ASE gain to produce the desired power. The input to the DCF fibre can be tailored to be constant which is desirable bearing in mind the high power density of the DCF discussed above. Thus, the length of fibre in the second section is chosen in accordance with the input power to the amplifier $P_{in}$ and the desired output power point. The length required for any given $P_{on}$ and $P_{out}$ will depend on the fibre properties such as the erbium doping concentration.

The third stage of the amplifier is similar to that of FIG. 3 with a pump laser pumping the third stage of EDF. This stage may be a conventional 1480 nm laser which is preferred as having better power conversion efficiency.

Thus, the amplifier of FIG. 4 comprises two fixed stages and a variable gain second stage, the second stage being a variable length EDF which is pumped by ASE power generated by the first stage. The ASE power is at a shorter wavelength than the output of the second and third stages. Thus, for example, the first stage laser could be chosen to generate L-band ASE which could then be used to pump the second stage to produce XL band flat gain.

FIG. 5 shows a plot of output power against wavelength for the first and second amplifier stages. Plot 80 is the output power for the first amplifier stage. It can be seen that there is a large peak at about 1560 nm. The area generally indicated by numeral 90 represents the ASE noise in the C-band. The C-band extends from about 1530 nm to 1560 nm. It can be seen from plot 85 that the C-band noise has been absorbed and that there are power spikes corresponding to the L-band channels. It will be appreciated that there is also some absorption in the transition zone between the C-and L-bands (1560–1570 nm).

The shape of the output curve from the third amplification stage is similar to plot 85. However, the power will be greater across the range of wavelengths.

Embodiments of the invention have a number of advantages. As discussed above, a single base amplifier can be produced for in-line or other amplification stages, with a cheap, easy to insert, second stage being selected to give the correct output power for a given input power. In practice, this may be rationalised to a number of passive EDF plug-ins, each covering a portion of the desired input power range. This is beneficial to manufacturers who do not need to produce a range of amplifier variants. Moreover, by eliminating a pump laser from one of the stages, together with related control circuitry, a further cost saving is achieved. It is considered that the embodiment of FIG. 4 may cost only about 70% of the cost of the embodiment of FIG. 3.

Embodiments of the invention have the further advantage that installation of the variable length plug-in is simple, reducing the time taken to install, and the skill required. Both of these factors reduce costs.

Embodiments of the invention have the further advantage that the use of a 980 nm high power pump laser in the first stage can achieve a near total inversion of $Er^{3+}$ ions leading to consistently low noise in the amplifier. This in turn limits the amount of further processing required and, as any further processing involves a degree of signal loss, the amount of amplification required.

Various modifications to the embodiments described are possible and will occur to those skilled in the art. For example, the invention is not limited to L-band amplifiers and is, in theory, applicable to any amplification in which ASE noise is generated at a wavelength shorter than the target wavelength. The invention is not limited to a three stage amplifier as described. Although a three stage amplifier is presently preferred, other configurations are possible and may be described in some circumstances. It is necessary to generate shorter wavelength ASE noise in a gain stage and to use that noise to pump a proceeding stage to produce a longer wavelength output.

The invention claimed is:

1. An erbium doped fiber amplifier (EDFA), comprising: first and second amplifier stages, the first amplifier stage including a high power pump laser and an erbium doped fiber for generating amplified spontaneous emission (ASE) at a first wavelength band, and the second amplifier stage including an erbium doped fiber arranged to be pumped by the ASE from the first amplifier stage to generate gain in signal channels at a wavelength band longer than the first wavelength band, the second amplifier stage including a removable length of erbium doped fiber arranged as a plug-in unit and which is selectable to produce a required output power for a given input power and which has connectors at ends of the removable length of the fiber for connection to the amplifier.

2. The EDFA according to claim 1, comprising a third amplifier stage for amplifying an output from the second amplifier stage and comprising a pump laser and an erbium doped fiber.

3. The EDFA according to claim 2, comprising a mid-stage loss arranged between the second and third amplifier stages.

4. The EDFA according to claim 3, wherein the mid-stage loss is arranged in the plug-in unit.

5. The EDFA according to claim 1, wherein the ASE produced by the first amplifier stage is in C-band.

6. The EDFA according to claim 1, wherein the gain generated by the second amplifier stage is in L-band.

7. The EDFA according to claim 1, wherein the high power pump laser of the first amplifier stage is a 980 nm laser.

8. The EDFA according to claim 1, wherein the high power pump laser of the first amplifier stage is of sufficient power to invert substantially all erbium ions in the erbium doped fiber of the first amplifier stage.

9. The EDFA according to claim 8, wherein the high power pump laser of the first amplifier stage has a power of 300 mw.

10. The EDFA according to claim 2, wherein the third amplifier stage pump laser is a 1480 nm laser.

11. An erbium doped fiber amplifier (EDFA), comprising: first, second and third amplifier stages, each of the first and third amplifier stages including a fixed gain stage having a pump laser and a length of erbium doped fiber, the pump laser of the first stage being a high pump power laser for generating amplified spontaneous emission (ASE) noise in a wavelength band shorter than a wavelength band of signals to be amplified by the EDFA, and the second amplifier stage including one of a plurality of plug-in stages each comprising a different length of erbium doped fiber which, in use, is pumped by the ASE noise generated by the first amplifier stage, the length of the erbium doped fiber of the one plug-in stage being removable and arranged as a plug-in unit which is chosen to produce a predetermined output signal power at the third amplifier stage for a given signal input power at the first amplifier stage.

* * * * *

UNITED STATES PATENT AND TRADEMARK OFFICE
CERTIFICATE OF CORRECTION

PATENT NO. : 7,061,667 B2　　　　　　　　　　　　　　　　　　　　　　　Page 1 of 1
APPLICATION NO. : 10/510795
DATED : June 13, 2006
INVENTOR(S) : Pegg It is certified that error appears in the above-identified patent and that said Letters Patent is hereby corrected as shown below:

In Column 1, Line 6, delete "(Erbiun" and insert -- (Erbium --, therefor.

In Column 1, Line 17, delete "insure" and insert -- ensure --, therefor.

In Column 6, Line 13, delete "$P_{on}$" and insert -- $P_{in}$ --, therefor.

Signed and Sealed this

Tenth Day of February, 2009

JOHN DOLL
*Acting Director of the United States Patent and Trademark Office*